United States Patent Office 2,765,283
Patented Oct. 2, 1956

2,765,283

SUPPORTED SILVER SURFACE CATALYST AND PROCESS OF PRODUCING SAME

Donald K. Sacken, Austin, Tex., assignor to Jefferson Chemical Company, Inc., New York, N. Y., a corporation of Delaware No Drawing. Application October 1, 1951,
Serial No. 249,221

10 Claims. (Cl. 252—441)

This invention relates to the production of silver surface catalysts for catalyzing the oxidation of olefins to olefin oxides, for example, ethylene to ethylene oxide, and to the resultant catalysts.

In the catalytic oxidation of olefins to olefin oxides, particularly ethylene to ethylene oxide, side reactions take place, such as the complete oxidation of the ethylene to carbon dioxide and water, oxidation of the desired ethylene oxide product and its conversion to acetaldehyde which may then itself be further oxidized. The complete oxidation of ethylene to carbon dioxide and water liberates much more heat than the desired partial oxidation to ethylene oxide with consequent local overheating of the catalysts and formation of hot spots in the reactor. These hot spots favor complete oxidation of the ethylene to carbon dioxide so that a runaway reaction ensues and the yield of desired ethylene oxide is sharply reduced.

Among the objects of this invention is to provide a silver surface catalyst for the oxidation of olefins to olefin oxides, particularly ethylene to ethylene oxide, which catalyst is of high activity and selectivity from the standpoint that it tends to favor the desired main reaction, i. e., the partial oxidation to olefin oxides.

Another object of this invention is to provide a novel method of producing such catalysts.

Other objects and advantages of this invention will be apparent from the following detailed description thereof.

In accordance with this invention the support or carrier for a silver surface catalyst prior to deposition of the silver thereon is pre-treated with a dilute solution of an inorganic chlorine-containing compound. This pre-treatment preferably is carried out by washing the carrier particles with the dilute solution of the inorganic chlorine containing compound and thereafter depositing silver oxide on to the thus washed carrier.

Surprisingly, it has been found that the pre-treatment of the carrier or support, as hereinabove described, results in a catalyst which shows remarkably high conversions and yields in the oxidation of olefins to olefin oxides, particularly ethylene to ethylene oxide. While the explanation for this is not fully understood, it is blieved that the inorganic chlorine containing compound is selectively adsorbed on particular areas of the carrier, which areas, when coated with silver, would otherwise become extraordinarily active centers of reaction. The formation of such highly active centers of reaction is accordingly eliminated by this invention, and a more uniformly active catalyst mass is obtained. The examples given below support the above theory or explanation of operation. It will be understood, however, that this invention is not limited to this theory or possible explanation.

As the carrier or support, silicon carbide and fused or crystalline alumina refractory materials including, but without limitation, Alundum, alusite, mullite and tabular corundum, crushed and screened to a convenient size, say from a fine dust to about 2 mesh, may be used. Any of the known carriers employed in the production of silver surface catalysts used for catalyzing the olefin to olefin oxide reaction may be employed. The exact size of the carrier particles will depend chiefly on the manner in which the catalyst is employed. In the case of fixed bed catalysts the preferred range of size is from 70 to 220 mesh (passing 70 and retained on 220 mesh screen) up to 2 mesh. Particularly preferred for fixed bed catalyst are catalyst particles having a size of from 2 to 10 mesh. For catalysts employed in accordance with the fluidized technique, the particle size may be within the range of from a fine dust to approximately 70 mesh. A preferred carrier is a fused aluminum oxide, such as the product designated as Alundum No. 38 by the Norton Company, hereinafter referred to as Alundum No. 38.

The crushed and screened carrier in accordance with this invention is washed with a dilute aqueous solution of an inorganic chlorine-containing compound. The washing may be carried out by agitating the carrier particles with the solution, by running the solution over the carrier particles, or by immersing the carrier particles in the solution and then removing excess solution. Any method which effects wetting of substantially the entire surface of the carrier particles will be found effective. The washing is carried out at room temperature (about 25° to 30° C.), but may be carried out at any temperature below the boiling point and above the freezing point of the dilute solution. Preferably, the washing is carried out so as to deposit on the carrier particles from 0.0001% to 0.2%, preferably from 0.001% to 0.02% by weight of inorganic chlorine-containing compound based on the weight of the carrier. The concentration of dilute solution used should preferably be within the range of from 0.001% to 0.05%, i. e., the washing solution should contain from 0.001% to 0.05% by weight of inorganic chlorine-containing compound. If a more concentrated solution is used, an after-wash with distilled water may be employed to remove some of the deposited chlorine-containing compound and leave on the carrier an amount of such compound coming within the range above noted.

Aqueous solutions of sodium chloride, barium chloride, lithium chloride, hydrogen chloride, potassium chlorate, other alkali metal or alkaline earth metal chlorides or chlorates, or of chlorine may be employed. Using a chlorine solution, the chlorine reacts with the water to form a solution containing hypochlorous acid and hydrogen chloride. The expression "solution of inorganic chlorine-containing compound" is used to include all such solutions including chlorine solutions.

Following the wash treatment the carrier particles may be dried, desirably at a temperature of from 110° to 180° C. Silver oxide is deposited on the washed carrier particles, as, for example, by agitating the carrier particles with a silver oxide paste and the resultant silver oxide catalyst dried at temperatures of from 110° to 180° C. The silver oxide may be prepared by treating silver nitrate or other soluble silver salt, such as silver acetatae, with sodium hydroxide, potassium hydroxide, barium hydroxide, or other hydroxide which precipitates silver oxide. The silver oxide and support are mixed in proportions to result in a catalyst containing from 1% to 50%, desirably 2% to 20% and preferably 2% to 10%, by weight of silver oxide based on the weight of the support.

The resulting silver surface catalyst consists of a support, preferably a fused alumina refractory material having a particle size from a fine dust up to 2 mesh and having thereon a small amount, e. g., from 0.0001% to 0.2%, preferably 0.001% to 0.02%, by weight based on the weight of the carrier particles of inorganic chlorine containing compound. A coating of silver oxide covers the inorganic chlorine-containing compound. The silver oxide is present in amount from 1% to 50%, desirably 2% to 20% and preferably 2% to 10%, by weight based on the weight of the carrier.

In use of the catalyst the silver oxide is converted to silver by heating, desirably by passing a stream of olefin and air at a temperature of 250°–290° C. over the catalyst. If desired, before the catalyst is introduced into the converter it may be subjected to a reduction treatment, say with ammonia or hydrogen or such reduction treatment may be carried out in the converter before the reactants are introduced thereinto. It will be understood the expression "silver" is employed in the specification and claims to include silver oxide.

The following examples are illustrative of preferred embodiments of the invention. It will be understood this invention is not limited to these examples.

In all examples the carrier used was Alundum No. 38. The carrier particles were washed at room temperature three times by decantation with equal volumes of distilled water, i. e., the volume of distilled water used for each wash was equal to the volume of carrier. After this wash treatment the carrier was dried and was thereafter washed at room temperature with equal volumes of the dilute solution of inorganic chlorine-containing compound, noted in the table below, of the concentration also noted in this table.

Following this pre-treatment, in all examples, the carrier particles were thereafter coated with freshly precipitated silver oxide produced by treating aqueous silver nitrate solution with sodium hydroxide, washing the resultant silver oxide precipitate with water and then mixing it with the carrier particles and agitating this mixture. The catalyst was thereafter dried for two hours at 140° to 164° C. while agitating. The finished catalyst contains about 4.5% by weight of silver oxide based on the weight of the carrier.

In all examples the catalyst was tested by placing the same in a stainless steel converter and passing a mixture containing 10 volumes of air per volume of ethylene at a space velocity of about 400 and an average contact time of 2.4 seconds through a fixed bed of the catalyst maintained at a temperature of about 280° C.

For comparative purposes three batches of catalyst were prepared in the same manner noted above with the sole difference that additional washing of the carrier with distilled water was substituted for the washing with the solution of inorganic chlorine-containing compound. These batches of catalyst were tested in the same manner as noted above. The data given in the table below opposite Test No. 1 represents the average of the results obtained in these three tests.

In all cases the oxidations were run for 40 minutes before taking gas samples for analysis. The results are summarized in the table which follows:

*Table*

| Test No. | Inorganic Chlorine Containing Compound Employed | Percent by Weight Concentration of Inorganic Chlorine-Containing Compound in the Wash Solution | Activity | Yield | Conversion |
| --- | --- | --- | --- | --- | --- |
| 1 | None | | 66.0 | 35.6 | 23.5 |
| 2 | Sodium Chloride | 0.0165 | 59.9 | 60.8 | 36.4 |
| 3 | do | 0.0165 | 60.4 | 58.4 | 35.3 |
| 4 | Hydrogen Chloride | 0.00103 | 59.9 | 58.6 | 35.1 |
| 5 | do | 0.00514 | 70.4 | 55.8 | 39.3 |
| 6 | do | 0.0103 | 65.9 | 54.9 | 36.2 |
| 7 | do | 0.0308 | 60.0 | 62.7 | 37.6 |
| 8 | Barium Chloride | 0.00293 | 57.5 | 48.5 | 27.9 |
| 9 | do | 0.0147 | 65.9 | 58.1 | 38.3 |
| 10 | do | 0.0293 | 53.9 | 49.0 | 26.4 |
| 11 | Lithium Chloride | 0.00119 | 60.5 | 54.2 | 32.8 |
| 12 | do | 0.0119 | 68.4 | 53.5 | 36.6 |
| 13 | do | 0.00597 | 69.8 | 49.6 | 34.6 |
| 14 | Potassium Chlorate | 0.005 | 53.5 | 49.5 | 26.5 |
| 15 | do | 0.01 | 60.0 | 53.3 | 32.0 |

In all of the above examples by "activity" is meant the percentage of the total ethylene which is oxidized. By the "yield" is meant the percentage of oxidized ethylene which is converted to ethylene oxide. By "conversion" is meant the percentage of the feed ethylene which is converted to ethylene oxide.

It will be noted from the above data that the catalysts embodying this invention are surprisingly active and selective in favoring the desired partial oxidation of olefins to olefin oxides.

Since certain changes may be made in carrying out the process of making the catalysts or in the catalysts themselves without departing from the scope of the invention, it is intended that all matter contained in the above description shall be interpreted as illustrative and not in a limiting sense.

What is claimed is:

1. In a process for producing a supported silver surface catalyst for catalyzing the oxidation of olefins to olefin oxides, the steps which comprise washing the support particles with an aqueous solution containing from 0.001% to 0.05% by weight of an inorganic chlorine containing compound to deposit thereon from 0.0001% to 0.2% by weight of said inorganic chlorine containing compound based on the weight of the support particles and thereafter depositing silver oxide on the thus washed support particles.

2. A process for producing a supported silver surface catalyst for catalyzing the oxidation of olefins to olefin oxides, which comprises washing the support particles with a solution containing from 0.001% to 0.05% by weight of an inorganic chlorine containing compound from the group consisting of alkali metal and alkaline earth metal chlorides and chlorates and hydrogen chloride to deposit on said support particles from 0.001% to 0.02% by weight of said inorganic chlorine containing compound based on the weight of the support particles, thereafter depositing freshly precipitated silver oxide on the thus washed support particles and reducing the silver oxide to silver.

3. A process for producing an Alundum supported silver surface catalyst for catalyzing the oxidation of olefins to olefin oxides, which comprises washing Alundum having a particle size of from a fine dust to about 2 mesh with a solution containing from 0.001% to 0.05% by weight of an inorganic chlorine containing compound from the group consisting of alkali metal and alkaline earth metal chlorides and chlorates and hydrogen chloride to deposit on said Alundum from 0.001% to 0.02% by weight of said inorganic chlorine containing compound based on the weight of the Alundum, thereafter agitating the thus washed Alundum particles with freshly precipitated silver oxide in amount to deposit from 1% to 50% by weight of silver oxide based on the weight of the carrier particles and reducing the silver oxide to silver.

4. A supported silver surface catalyst for the oxidation of olefins to olefin oxides comprising Alundum having a particle size of from a fine dust to about 2 mesh having thereon from 0.001% to 0.02% by weight based on the weight of the Alundum of hydrogen chloride, said hydrogen chloride being covered with silver in amount of from 2% to 20% by weight based on the weight of the Alundum support.

5. A supported silver surface catalyst for the oxidation of olefins to olefin oxides comprising Alundum having a particle size of from a fine dust to about 2 mesh having thereon from 0.001% to 0.02% by weight based on the weight of the Alundum of barium chloride, said barium chloride being covered with silver in amount of from 2% to 20% by weight based on the weight of the Alundum support.

6. A supported silver surface catalyst for the oxidation of olefins to olefin oxides comprising Alundum having a particle size of from a fine dust to about 2 mesh having thereon from 0.001% to 0.02% by weight based on the weight of the Alundum of lithium chloride, said lithium chloride being covered with silver in amount of from 2% to 20% by weight based on the weight of the Alundum support.

7. A supported silver surface catalyst for the oxidation of olefins to olefin oxides comprising Alundum having a particle size of from a fine dust to about 2 mesh having thereon from 0.001% to 0.02% by weight based on the weight of the Alundum of potassium chlorate, said potassium chlorate being covered with silver in amount of from 2% to 20% by weight based on the weight of the Alundum support.

8. A supported silver surface catalyst for the oxidation of olefins to olefin oxides comprising support particles having an underlayer deposited thereon of from 0.0001% to 0.2% by weight based on the weight of the support particles of a water soluble inorganic chlorine containing compound and said support particles having an overlayer deposited thereon of metallic silver.

9. A supported silver surface catalyst for the oxidation of olefins to olefin oxides comprising a support material having a particle size of from a fine dust to about 2-mesh said support particles having an underlayer deposited thereon of from 0.0001% to 0.2% by weight based on the weight of the support material of a water soluble inorganic chlorine containing compound and said support particles having an overlayer deposited thereon of metallic silver in amount of from 1% to 50% by weight based on the weight of the support material.

10. A supported silver surface catalyst for the oxidation of olefins to olefin oxides comprising Alundum having a particle size of from a fine dust to about 2-mesh having an underlayer deposited thereon of from 0.0001% to 0.2% by weight based on the weight of the Alundum of sodium chloride and said Alundum particles having an overlayer deposited thereon of metallic silver in amount of from 2% to 20% based on the weight of the Alundum support.

References Cited in the file of this patent

UNITED STATES PATENTS

| | | |
|---|---|---|
| 2,125,333 | Carter | Aug. 2, 1938 |
| 2,156,341 | Langwell | May 2, 1939 |
| 2,178,454 | Metzger | Oct. 31, 1939 |
| 2,246,900 | Schulze et al. | June 24, 1941 |
| 2,424,085 | Bergsteinsson et al. | July 15, 1947 |
| 2,454,227 | Smith et al. | Nov. 16, 1948 |
| 2,463,228 | West et al. | Mar. 1, 1949 |
| 2,582,254 | Hunter | Jan. 15, 1952 |
| 2,615,900 | Sears | Oct. 28, 1952 |